Figure 1:
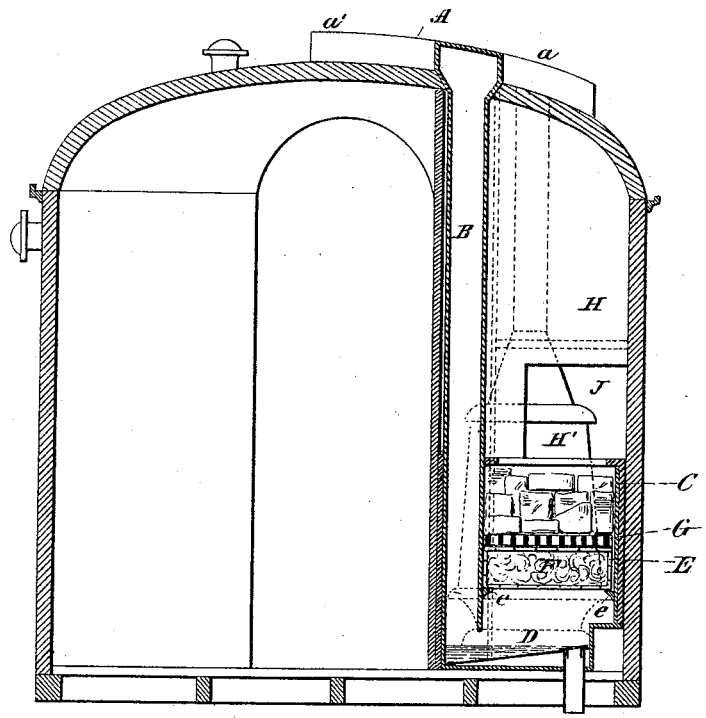

(No Model.)  2 Sheets—Sheet 1.

W. D. MANN.
VENTILATING APPARATUS.

No. 366,414.  Patented July 12, 1887.

WITNESSES:
Gustave Dieterich
Wm. Goebel

INVENTOR
Wm. D. Mann
BY Knight Bros.
ATTORNEYS

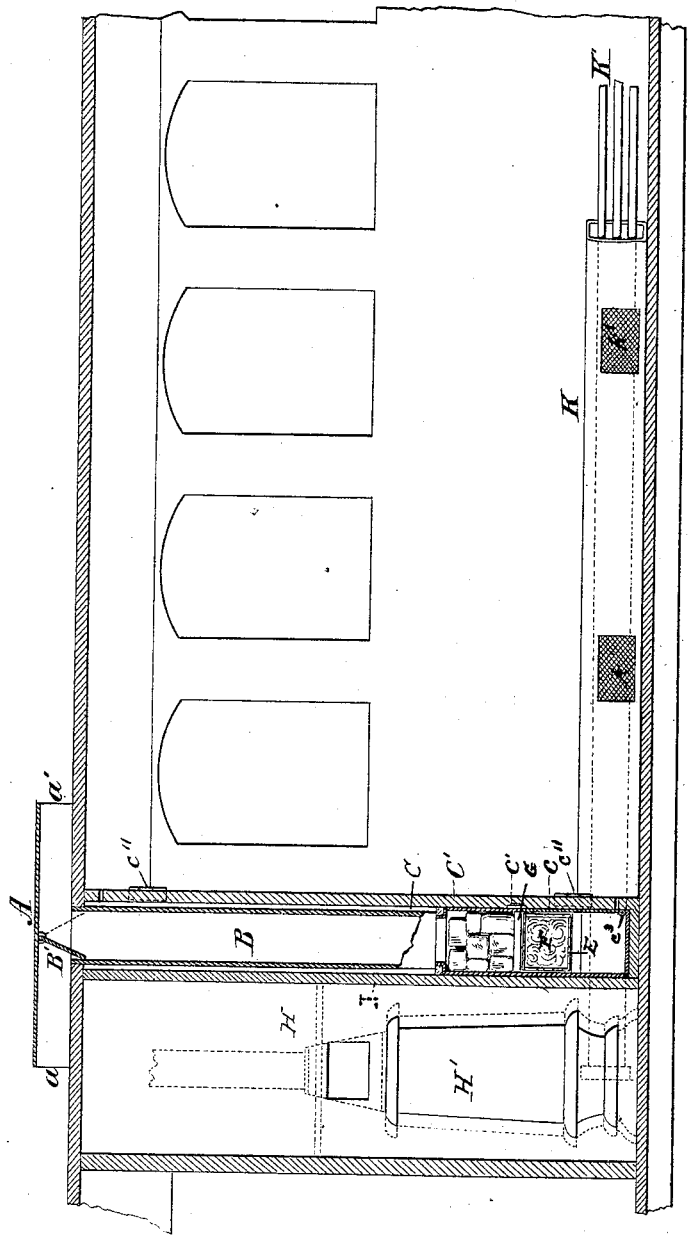

UNITED STATES PATENT OFFICE.

WILLIAM D. MANN, OF NEW YORK, N. Y., ASSIGNOR TO MANN'S BOUDOIR CAR COMPANY.

VENTILATING APPARATUS.

SPECIFICATION forming part of Letters Patent No. 366,414, dated July 12, 1887.

Application filed May 21, 1886. Serial No. 202,905. (No model.)

*To all whom it may concern:*

Be it known that I, WILLIAM D'ALTON MANN, a citizen of the United States, residing in the city of New York, in the county and State of New York, have invented certain new and useful Improvements in Ventilating Apparatus, which are particularly adapted for use in railway-cars, but which may be employed to advantage in other structures, of which the following is a specification.

My invention relates to a novel filtering apparatus, which may be introduced in any suitable manner in a conduit, shaft, or other opening through which a current of atmospheric air can be introduced, the purpose of the filtering apparatus being to remove all deleterious, noxious, or poisonous matters or gases with which the air is laden as it enters the shaft or opening aforesaid.

Heretofore it has been the practice to employ wire-gauze of various-sized meshes for straining the air, such apparatus answering the purpose to some extent, as it will remove cinders and particles of matter of a comparatively large size; but it is not sufficient to prevent the ingress of the smaller particles or shut out obnoxious and poisonous gases. It has been customary, also, to employ water-tanks for this purpose and to force or exhaust the air through the water, which serves as a filtering medium for the air; but the apparatus necessary to carry such a method into practical effect is too cumbersome and expensive for ordinary purposes.

To avoid the drawbacks above enumerated, and at the same time produce a thorough and efficient ventilator easy of manipulation and economical of construction, I arrange in any suitable opening or air-passage a removable receptacle containing suitable fibrous material, though I preferably employ a fiber that has a certain amount of stiffness, for the reason that it will not become cloggy upon the application of water, (as a soft fiber, such as cotton, would,) thereby obstructing the passage of the air through it.

A suitable arrangement embodying and utilizing moistened fiber as above described possesses all the advantages of both the wire-gauze and the liquid ventilators without the drawbacks of either, inasmuch as the fibrous material will serve to intercept any particle of matter in a manner similar to that of wire-gauze, at the same time permitting the free passage of the air, while the moisture will absorb any impure and noxious gases which may happen to be held in suspense by the atmosphere when it enters the ventilator.

It will be seen from the above description that my improved apparatus for purifying the atmosphere as it enters an apartment resembles the filtering apparatus in an animal's nose, and repeated experiments have demonstrated that a suitable fiber, preferably stiff in its nature and moistened, as will be described, affords a more perfect air-filtering medium than anything now employed.

My present invention relates also to improvements in the devices shown and described in my previous Letters Patent of the United States, No. 327,289, dated September 29, 1885, car-ventilator, and has for its object the providing of more convenient means for carrying the invention therein described into practical operation, as well as for economizing and preserving the fibrous material employed in the ventilator.

In the Letters Patent above referred to I show and describe a ventilating apparatus, which I have put into practical operation on several Mann boudoir-cars, and which has proved very efficient and desirable, for the reasons that the supply of air to the cars is rendered free from all impurities, is continuous without the disagreeable feature of drafts, and for the additional reasons that the supply can be transformed from a cool atmosphere in summer to a warm atmosphere in winter.

Figure 2:
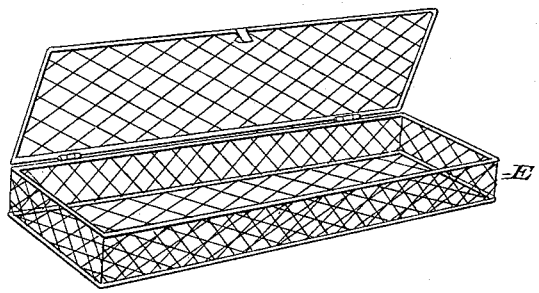

Referring to the accompanying drawings, which form a part of this specification and serve to illustrate my invention, Figure 1 is a transverse vertical section of a car-body with my ventilating apparatus applied. Fig. 2 is a perspective view on a larger scale of the basket or box for holding the moistened fiber removed from its normal position. Fig. 3 is a longitudinal section of a car with my apparatus applied.

In the apparatus shown I provide a double-apertured entrance for the atmospheric air in the shape of a funnel, A, the two entrances $a\ a'$ opening in opposite directions and toward the ends of the car. These openings may be covered by wire-gauze, if desired, to exclude flying sparks or cinders from the air-shaft.

B is an air shaft or conduit leading down from the funnel into the interior of the car, B' being a swinging door hinged at the junction of the funnel and the air-shaft, so as to direct the current from the former to the latter.

The air shaft or conduit B is preferably situated at one end of the car, and discharges into an air-filter and cooling-chest, C, having entrance-doors C', hinged at c'' c'' and opening, as indicated in dotted lines, for affording access to the same.

The cooling-chest and filter is provided with a tank, D, containing water, and a basket or box, E, containing a stiff fiber, F, such as horse-hair or some other suitable fibrous material that is adapted to retain a certain amount of water without becoming water-soaked or clogged. The basket or box E is adapted to slide into the position as shown in Fig. 1, and rests upon lugs or pins $e$, protruding from the sides of the chest C. A drop-door, $c$, hinged at $c^3$ and having a latch, $c'$, is provided in the chest C, to permit of the basket E being removed and replaced. Supported above this basket or box is a grate, G, for holding ice, which ice will gradually melt and serve to keep the fiber moist, and will also serve to cool the air passing through the ventilator to the interior of the apartment.

Adjoining the filtering-chest C is a heating-chamber, H, containing a stove, H'; and J represents a large aperture in the division-wall between said heating-chamber H and filtering-chest C, through which aperture air can pass from the latter to the former.

K represents a flue or conduit from the chamber H, having hot-water or steam pipes K', if desired, and provided with apertures $k'$, which open into the interior of the car or apartment.

As the air enters the funnel A it passes into the shaft B and thence into the filtering-chest C at a point just above the surface of the water contained in the tank D. The draft of air being downward, a portion of the coarser dust and cinders will be caught by the water. From this point the air passes upward through the moistened fibrous filtering material F, contained in the basket E. The moistened fiber will serve to intercept any foreign and deleterious matter, and at the same time will absorb any noxious or unwholesome gases which might otherwise escape into the interior of the car. After the air leaves the filtering-basket it passes upward and around and about the lumps of ice in the upper part of the chest C. The cool filtered air then passes into the closet H, and from thence by means of the flue K into the car-interior. When the weather is cold, the stove H' can be utilized to heat the air as it passes through the closet H; and, instead of employing ice to keep the fiber wet, I may depend a part of the latter into the water in the tank D, and the fiber can thus be constantly moistened by means of capillary attraction. In the course of time the moistened fiber will become more or less filled with cinders, dust, and other foreign matter, when it can easily be cleaned by simply withdrawing the basket E from its normal position in the chest C. When the basket has been removed, the cover can be lifted and the fibrous material taken out and washed and cleaned. After this it is replaced within the basket and the lid is shut down and locked, thus confining the filtering material and permitting an easy manipulation of the basket, so that it can be restored to its proper position within the chest C without any inconvenience.

The employment of the horse-hair or other stiff fiber is beneficial and economical, not only for the reasons that it will not become water-soaked and matted, but also because it will not disintegrate and decay, as some fibrous materials would if constantly exposed to heat and moisture.

The basket E is made of open wire or metal work, so that a current of air can pass freely through it.

Although I have described my filtering apparatus as peculiarly adapted to railway-cars, yet I do not limit myself to this application of it, as it may be employed to advantage in ventilating houses, theaters, and other structures.

Having thus described my invention, what I claim as new therein, and desire to secure by Letters Patent, is—

1. In a device for purifying air, the combination of an air-trunk, a mass of fibrous material placed therein for intercepting the current of air as it passes therethrough, means for keeping said material saturated, and a removable reticulated receptacle in which said material is contained, substantially as set forth.

2. In a device for purifying air, the combination of the air-trunk, the grating G, placed across the said trunk for the support of ice, a filtering medium consisting of a mass of fibrous material placed across said air-trunk beneath the grate G, and a removable reticulated receptacle containing said fibrous material, substantially as and for the purposes set forth.

3. In an air-purifying device, the combination, with a mass of fibrous material and a reticulated receptacle, within which it is contained, of an air-trunk, within which said receptacle fits, having an opening for the insertion and removal of said receptacle, a door closing said opening, and means for keeping the fiber saturated, substantially as set forth.

W. D. MANN.

Witnesses:
HURBERT KNIGHT,
J. H. LEWIS.